United States Patent Office 3,324,165
Patented June 6, 1967

3,324,165
PRODUCTION OF ALIPHATIC DINITRILES
Karl Baer, Weinheim, and Martin Decker, Joseph Schmidt, Heinrich Sperber, and Gerhard Leibner, Ludwigshafen (Rhine), Germany, assignors to Badische Anilin- & Soda-Fabrik Aktiengesellschaft, Ludwigshafen (Rhine), Germany
No Drawing. Filed June 29, 1964, Ser. No. 378,934
Claims priority, application Germany, July 3, 1963, B 72,514
9 Claims. (Cl. 260—465.2)

This invention relates to the production of aliphatic dinitriles of dicarboxylic acids and ammonia. More specifically, the invention relates to a new type of catalyst or supported catalyst for the reaction.

It is known that nitriles of monocarboxylic or polycarboxylic acids of the aliphatic, cycloaliphatic and aromatic series can be prepared by catalytic reaction with ammonia in the gas phase at elevated temperature. Conventional dehydrogenation catalysts are used, for example silicic acid, silicates, aluminas or mixtures of these substances. In the reaction of non-aromatic dicarboxylic and polycarboxylic acids, particularly those whose carboxylic groups are separated from each other by only a few methylene groups, for example two to four methylene groups, undesirable secondary reactions take place. Substances having an acid reaction, for example phosphoric acid, acid phosphates, boric acid, boron phosphate, vanadic acid, molybdic acid, tungstic acid or heteropoly acids are therefore also added. Thus for example in the reaction of adipic acid in the presence of silica gel as catalyst, 77% of adiponitrile and 13.6% of cyclopentanone are formed. If however phosphoric acid be added to the silica gel, 88% to 90% of adiponitrile and 1 to 2% of cyclopentanone are obtained.

In the prior methods the catalysts are usually arranged stationary in the reactor. The length of the cycle up to the point when the catalyst has to be regenerated depends on the load. Thus for example a particular catalyst loaded with 260 g. of a dicarboxylic acid, such as adipic acid, per liter of catalyst per hour has to be regenerated after twenty hours, i.e. one liter of catalyst can react a total of 5200 g. of adipic acid. If the same catalyst is loaded with only 26 g. of the said initial material, the activity is retained for about 1700 hours, i.e. one liter of catalyst can react 44,200 g. of adipic acid. Since the formation of nitriles is endothermic and a considerable amount of heat has to be supplied in the processing of dicarboxylic and polycarboxylic acids, it is advantageous to use the catalyst in fluidized condition. Even in a fluidized bed, however, the catalyst must be freed from carbon deposits after thirty to forty hours if the catalyst is strongly loaded.

It is an object of the invention to provide a process for the production of aliphatic dinitriles from aliphatic dicarboxylic acids and ammonia in contact with catalysts having a long life. It is another object of the invention to provide a process for the production of the said dinitriles in contact with catalysts which can be strongly loaded. It is a further object of the invention to provide a method for producing aliphatic dinitriles in contact with catalysts which are suitable for fluidized bed reactions and which give high yields and small amounts of byproducts. Yet another object of the invention is to provide a process for the manufacture of dinitriles in contact with a catalyst which does not require frequent regeneration.

These and other objects and advantages of the invention are achieved in the production of saturated aliphatic dinitriles by reaction of saturated aliphatic dicarboxylic acids with ammonia at temperatures of 300° to 500° C. in the presence of a fluidized bed of catalysts, if the catalyst particles are used in the form of globules having cavities accessible from outside. It is supposed that the diffusion behavior of the catalyst is so improved by the particular shape of the hollow globule that the adsorption of the initial material and the desorption of the end product take place considerably more rapidly and with less decomposition than in the case of the prior art catalysts. Accordingly, the selectivity of these catalysts is better and the amount of byproducts is less than in the case of catalysts which have no cavities. For example by using new silica gel catalyst having phosphoric acid activator in the reaction of adipic acid, 93 to 95 mole percent of adipodinitrile, about 0.5 to 1% of cyanocyclopentanonimine and only traces of cyclopentanone are obtained. The life of the catalyst before regeneration is necessary is 200 to 400 hours at a loading of about 100 to 600 grams per liter of catalyst per hour.

Catalysts and catalyst carriers of the type used according to this invention are obtained by spraying a hydrogel containing at least 30% by weight of water, suspension and/or solution of a metal compound, advantageously after having been heated, at a pressure of 10 to 100 atmospheres advantageously in the presence of an expanding agent, through one or more nozzles into a tower shaped vessel, and at the same time introducing a gas heated to 300° to 700° C. in an amount of 4 to 18 cubic meters per kilogram of initial material in the neighborhood of at least one of the nozzles.

In the new process it is advantageous to correlate the pressure, the opening in each nozzle and the hourly throughput of the substance to be sprayed so that at least 80% of all the sieve fraction of the final globules (or beads) have a diameter of more than 900 microns. If the characteristic of the beads is based on the grain size characteristic $\delta^1$ and the uniformity coefficient $n$ according to Puffe, the value for these hollow beads lies between $\delta^1=0.13$ at $n=5$ and $\delta^1=0.35$ at $n=3$ (see E. Puffe, Zeitschrift für Erzbergbau und Metallhüttenwesen, volume 1 (1948), part 4, page 97 et seq.).

The catalytic activity of a catalyst particle is known to depend on the size of the geometric surface. In the case of spherical particles, diffusion, which effects exchange with the active places in the interior of the bead, proceeds too slowly. Sometimes, even in the case of carriers, it is not possible to utilize the whole inner surface. In the case of a hollow sphere, however, the geometric surface for the same radius is about twice as great as with the spherical shape. Diffusion into the interior of the sphere is facilitated and the whole surface thus becomes catalytically active. Moreover, owing to the low inner stress of a hollow sphere, it has a longer service life, better mechanical resistance and advantages in supply and withdrawal of heat at the catalytically active centers of the particles. The hollow spheres are exposed to only slight mechanical abrasion and offer resistance to mechanical stresses, for example in a fluidized bed, even when brittle and hard materials are used, as in the case of silica gel. In the event of deposits of carbon and the like on the surface of the catalyst and mechanical stresses thereby set up, hollow spherical particles are also stable.

Suitable initial materials for the production of catalyst particles according to this invention are silicic acid hydrogels or alumina hydrogels, and also hydrogels of silicates and titanium dioxide, which are usually present in the form of a viscous mass having a solids concentration of between 15 and 40% by weight, particularly between 15 and 30% by weight.

For example silicic acid hydrogels obtained from waterglass are suitable. They are obtained by conventional methods, for example by running waterglass in suitable dilution, for example at a density of 1.15 to 1.25 g./ccm., at a temperature of $-5°$ to $+15°$ C., particularly of $+5°$ to $+10°$ C. into a mineral acid, preferably sulfuric acid, especially sulfuric acid of 20 to 40 weight percent, and allowing the resultant sol to solidify, a pH value of 7 being not exceeded. A solution of one or more metal compounds, for example a solution of an aluminum, magnesium or zinc salt, may be added in an amount of up to 20% by weight calculated on oxides and with reference to the total of silicic oxide and metal oxides.

The silica sol obtained is allowed to solidify and is then freed from neutral salts by washing with ammoniacal water at a pH of 8 to 12. It is advantageous not to remove alkali completely but to adjust the alkali content to about 0.5 to 4%, particularly 0.8 to 3% of alkali oxide ($Na_2O+K_2O$). Alternatively, 20 to 30 wt. percent sulfuric acid may be added at room temperature with intense stirring to a waterglass solution of the said concentration and the resultant precipitate washed until free from salt. Prior to precipitation, ammonia or ammonia salts and/or the solution of one or more metal compounds in an amount of up to 20 wt. percent, calculated as metal oxide and based on the total of $SiO_2$ and metal oxide, may be added, the pH not falling below 7. The hydrogel has a solids concentration of 15 to 35%, preferably 15 to 30%. Useful alumina hydrogels are obtained by precipitation from solutions of aluminum salts and ammonia or caustic solutions or aluminates with acids, preferably 40% nitric acid. For example, water is placed in a vessel and then a sodium aluminate solution and, simultaneously, such an amount of 40% nitric acid are run in at a temperature of 30° to 90° C., especially 40° to 60° C., that a pH of 7.5 to 10, especially 8 to 9, is set up. The precipitate is filtered off, washed for 2 to 12 hours and the filtrate slurried with ammoniacal water at pH 9 to 12 for 2 to 6 hours and freed from residual nitrate by washing.

In general, a 20 to 30% ammonia solution, a temperature of between 20° and 40° C. and a pH of 8 to 11 are used for precipitating an aluminum salt solution. The hydrogels are then peptized with 0.3 to 5% of a mineral acid, for example nitric acid, sulfuric acid, phosphoric acid or a halogen hydracid, such as hydrochloric acid, or acetic acid, or by the action of dilute alkalies. To carry out the peptization, the hydrogel is moistened for example with 0.1 to 5%, particularly 0.5 to 2%, of peptizing agent, for example sprayed therewith, and then mixed well. The mixture is then supplied to a mill, for example a toothed disk mill, and ground therein for a long period until the mixture has become mobile. The viscous mass may also be subjected direct to the grinding process without previous peptization. A product of similar viscosity may be obtained by prolonged and intense grinding. If necessary, the solids content should be decreased by adding water to 10 to 15%. It is advantageous for some ground material to be added in an mount of for example 3 to 60% by weight, particularly 3 to 30% by weight, prior to grinding. The grinding period may thus be shortened, the grinding process facilitated and the product obtained in a more homogeneous condition. It is also advantageous to add 1 to 10%, particularly 2 to 8%, of finished catalyst to the mixture prior to grinding. Such an addition causes a better development of the cavities in the beads in the subsequent production of the catalyst particles. Peptization may also be improved by supplying some ground material before or during the addition of the peptizing agent. A better action of the peptizing agent on the whole is thereby achieved. The hydrogels are heated, advantageously to 30° to 90° C. and forced at a pressure of 10 to 100 atmospheres, particularly 15 to 85 atmospheres, for example 15 to 70 atmospheres, through a nozzle having an opening of about 0.5 to 4 mm., particularly 1.2 to 3.5 mm. The nozzle is situated at the upper end of a vertical spray tower. If the spray cone has an angle of 30°, the gas is introduced in the neighborhood of the nozzle. When the spray cone has a greater angle, for example 60°, introduction of the gas is distributed over the whole cross-section of the tower. Initial material and gas flow cocurrent through the spray tower. The gas is heated up to about 300° to 700° C., particularly 350° to 650° C., and used in an amount of 4 to 15 ccm., advantageously 5 to 10 ccm., per kilogram of initial material.

The temperature and the amount of gas in relation to the amount of hydrogel supplied per unit of time are particularly important for the production of the hollow bead catalysts. They are advantageously adjusted so that a mean temperature gradient of at least 50° C. per meter, for example 50° to 100° C., occurs from the gas inlet to half-way through the tower. The drops should be coated with an extensible but tough skin in the neighborhood of the nozzle. The process of forming this skin may be assisted by introducing cold air beside the nozzle. If the drops then pass into the hot gas current, the enclosed liquid should evaporate rapidly. The heat supplied for this purpose should be sufficient to cause immediate vaporization of the bulk of the liquid droplets covered with a skin.

Drying towers having a height of 8 to 15 m., particularly 10 to 12 m., and a diameter of 1 to 5 m., particularly 3 to 4.50 m., are usually employed for the production of the catalyst. The hourly throughput is about 300 to 600 kg., particularly 350 to 500 kg., in towers having a diameter of 3 m. and about 120 to about 280 kg. in towers having a diameter of 2 m. Residence periods of the silica gel in the drying tower of about 20 to 100 seconds are achieved. A temperature gradient is maintained within the drying tower. The temperature is kept at its highest at the point of entry of the hydrogel; in the lower portion of the tower it falls rapidly. From the gas outlet to half-way down the tower, there is a mean temperature drop of at least 50° C. per meter. The particles of silica gel therefore pass in a comparatively short time into a region which is colder by 150° to 280° C. After leaving the hot zone, there is produced by heat transfer in the superficially dried droplets a certain vapor pressure of the volatile components of the droplets which causes the thin surface layer of the droplets to expand until finally by bursting there are formed spherical particles having cavities accessible from outside.

During the production of the catalyst the pressure, opening of the nozzle and hourly throughput of the substance to be sprayed are correlated to each other so that at least 80% of all sieve fractions of the finished beads are more than 90 microns. If the characteristic of the grain size distribution of the hollow beads is based on the grain size characteristic $\delta^1$ and the uniformity coefficient $n$ according to Puffe, particularly useful hollow bead catalysts or carriers are obtained when their grain size characteristic $\delta^1=0.13$ at $n=5$ and $\delta^1=0.35$ at $n=3$ (ibid.), and their total pore volume is 0.8 to 1.3, particularly 0.9 to 1.2 ccm./g. (determined by the mercury method). A description of the mercury method can be found in the article by H. L. Ritter and L. C. Drake in Industrial and Engineering Chemistry, Analytical Edition, vol. 17, pp. 782–786 (1945). A maximum occurs in the pore distribution curve at about $10^4$ to $10^5$ A. and one or more maxima at about $10^2$ A. 5 to 20% and 7 to 15% of the total pore volume is in the form of macropores of more than $2.8 \times 10^4$ A. In the hemispherical bead catalysts which it is preferred to use, the total volume of these macropores should be more than 0.07, particularly 0.12 to 0.2, ccm./g.

Formation of beads provided with cavities is promoted by the presence in the silica gel of readily vaporizable substances, such as ammonia, nitric acid, ammonium salts or, when sufficiently high temperatures are used, also water. Any substances other than water which are added to the hydrogel prior to spraying are used in amounts of 0.5 to 5% and including the amount used in the washing process based on the suspension sprayed.

The high inlet temperature also has a favorable influence on the formation of bead particles having cavities.

The spherical particles are then soaked in the conventional way for example with a dilute phosphoric acid and heated, the relative proportions being chosen so that the finished catalyst contains 5 to 25% by weight, particularly 5 to 20% by weight, of phosphoric acid.

In the same way as the abovementioned silica gel catalyst with phosphoric acid, other catalysts suitable for nitrile syntheses may also be prepared, for example silica gel with a mole amount of oxides of metals, such as chromium, molybdenum, tungsten, vanadium, zinc, tin, manganese, nickel, cobalt and/or titanium, preferably with a mole amount of phosphoric acid, or silica gel alone, or aluminas with the said metal oxides, or alumina alone, or boron phosphate, silica gel-boron phosphate, silica gel-boric acid and aluminum phosphate. A catalyst containing silica gel which contains 5 to 20% of free phosphoric acid has proved to be particularly suitable for the production of adipodinitrile. The necessary amount of phosphoric acid may be used at the same time as a peptizing agent so that the catalyst can be prepared in one operation. Catalysts are preferred which contain a larger amount of phosphoric acid within the said range, for example 8 to 20%, in order to keep the imine content in the reaction product low.

The initial material for the production of the aliphatic dinitriles may be for example succinic acid, glutaric acid, adipic acid, suberic acid or decanedicarboxylic acid or generally speaking saturated aliphatic dicarboxylic acids having four to twelve carbon atoms. The reaction is carried out in a conventional way by introducing the dicarboxylic acid into the stream of ammonia, passing the dicarboxylic acid and the ammonia, or the ammonium salt of the dicarboxylic acid formed therefrom, over the catalyst in fluidized motion at the reaction temperature and separating the dinitrile from the gas leaving the reactor, for example by cooling or by washing with water.

In the case of solid carboxylic acids it has proved to be particularly advantageous to introduce these in solid condition, for example as a powder, in a stream of ammonia to the fluidized bed. In general 4 to 20 moles of ammonia is used per mole of carboxylic acid.

Heating of the fluidized bed may be carried out by supplying hot ammonia, by heating by means of heating jackets or by means of heating elements arranged in the interior of the fluidized bed. The fluidized bed may be produced with a stream of ammonia. It is advantageous to bring the catalyst to the reaction temperature by supplying heat through a heating jacket or heating elements in the fluidized bed.

The reaction temperature is from 300° to 500° C. Temperatures of 350° to 420° C., particularly below 410° C., are preferred.

The process is usually carried out at atmospheric pressure, but it is also possible to use subatmospheric pressure or slightly superatmospheric pressure, for example 1 to 10 atmospheres.

The reaction gases are cooled. The dinitrile formed is thus separated and can be purified by conventional methods, for example by distillation.

The catalyst may readily be regenerated by a gas stream containing oxygen at elevated temperature, but advantageously below 500° C., when its activity subsides.

It is observed that secondary reactions, for example formation of imines, is suppressed by using coarser catalyst particles, for example of 0.2 to 0.4 mm.

The following example will further illustrate the invention.

EXAMPLE

(A) Production of the catalyst

A number of portions, each of 150 kg., of silicic acid hydrogel (which has been washed free from sulfate with ammoniacal water, which contains 0.35% of ammonia and which has a pH value of 9) and 3.9 kg. of 73% phosphoric acid are introduced with continuous stirring into a container having a capacity of 3 cubic meters until the container is full. The whole is then further stirred for another three hours. The hydrogel thus peptized is sransferred to another stirred container having a capacity of 5 cubic meters, and mixing of a charge in the first stirred container is repeated. The silicic acid hydrogel-phosphoric acid mixture, which has become mobile, then flows from the second stirred container into a toothed disk mill and is brought into a readily flowable form therein. The material passes thence in an amount of 500 kg. per hour, with interposition of a high pressure metering piston pump into the nozzle of a high pressure atomizing dryer, the bore of the nozzle being 2 mm. At the said throughput, a pressure of the mass to be sprayed of 50 atmospheres is set up. By reason of the heat liberated by grinding and conveyance, the mixture heats up to about 50° to 80° C. prior to entry into the spray dryer. The product is injected through the nozzle into the upper end of a drying tower 11 m. in height and 3 m. in diameter. At the same time 200 cubic meters (S.T.P.) of unheated air is introduced around the nozzle per hour and 5000 cubic meters (S.T.P.) of air heated to 500° C. is introduced per hour at several places beside the nozzle for drying the product. Up to the middle of the tower, the temperature of the said air has fallen to 250° C. and when it leaves the tower its temperature is about 190° C. The end product contains about 5% of water capable of being liberated at red heat. The grain size characteristic is 0.14 mm. and the uniformity coefficient is 3.5. 82% of the sieve fraction is above 90 microns.

The catalyst consists of beautifully formed spheres which exhibit at one or more places access to the cavities in the interior. If a few of these beads are broken open, it becomes clear that they are preeminently hollow beads in the form of shells. The catalyst thus prepared may be used direct for the production of adipodinitrile. If the small amount of water contained therein would give rise to trouble in starting up, the catalyst may be heated direct to temperatures of up to 500° C. without its activity being changed in any way.

If about 10 kg. of already dried catalyst be added to each 150 kg. of the silicic acid hydrogel jelly, the viscosity of the mass to be sprayed is increased somewhat and the hollow spherical shape is better formed. This becomes evident particularly in the powder density. This falls from 450 g./l. to about 360 g./l. by adding 10 kg. of already dried silicic acid-phosphoric acid catalyst to the original hydrogel.

(B) Production of adipodinitrile 4 liters of the catalyst prepared as described above is placed in a vertical reactor having a diameter of 100 mm. and a length of 1200 mm. The bed of catalyst which is heated up to a temperature of 380° to 400° C. by electrical heating is kept in fluidization by a stream of 900 liters (S.T.P.) per hour of ammonia preheated to 200° to 400° C. 1000 g. of adipic acid and 800 liters (S.T.P.) of ammonia are introduced per hour into the fluidized bed. After the reaction products have left the reactor, they are condensed by cooling. The organic layer is separated and the aqueous layer is extracted with toluene. The extract and the organic layer are united and distilled. 750 g. per hour of an aqueous crude adiponitrile is obtained. This is distilled under subatmospheric pressure at 10 mm. Hg. A first running passes over at up to 130° C. which consists mainly of water and also traces of cyclopentanone. Between 130° and 180° C., pure adipodinitrile is obtained in an amount of equivalent to 95% of the theory with reference to the adipic acid supplied. It contains only 0.5% of cyanocyclopentenamine. 1 to 2% of a residue consisting of cyanovaleric amide remains.

After 115 hours, the activity of the catalyst subsides. It is regenerated with a current of air at a temperature of 500° C. down to a few percent of deposit and may then be used again. If the loading of the catalyst be decreased to 125 g. of adipic acid per liter of catalyst per hour, the service life before regeneration of the catalyst is doubled.

If on the other hand a silica gel be used as catalyst which has been obtained by conventional drying and grinding to 0.1 to 0.3 mm. (and which therefore does not contain any cavities) which also contains 10% by weight of phosphoric acid, only 80% of the theory of pure adiponitrile is obtained with 2% of cyanocyclopentenamine, and the catalyst has to be regenerated after only 25 hours.

We claim:

1. A process for production of aliphatic dinitriles, the nitrile groups of which are separated by polymethylene groups having two to ten methylene groups, which comprises reacting at 300–500° C. an aliphatic dicarboxylic acid, the carboxyl groups of which are separated by polymethylene groups having two to ten methylene groups, with ammonia in a fluidized bed of a hydrogel catalyst in which the hydrogel particles are obtained by the spray drying of hydrogel containing a member selected from the group consisting of silica and alumina, the fluidized particles of said catalyst being hollow, hydrogel spheres having a total pore volume of 0.8 to 1.3 cc. per gram, as determined by the mercury method, and having 5–20% of said total pore volume in the form of macropores of more than $2.8 \times 10^4$ A.

2. A process as claimed in claim 1 wherein at least 80% of all sieve fractions of said catalyst are more than 90 microns.

3. A process as claimed in claim 1 wherein said catalyst is one prepared by spraying a silica hydrogel contaning at least 30% by weight of water and of a temperature of 30 to 90° C. under a pressure of 10 to 100 atmospheres into a vertical drying zone in which a drying gas of a temperature of from 300 to 700° C. is led cocurrently to the sprayed hydrogel.

4. A process as claimed in claim 3, and mixing 1–10% of spray-dried particles of said catalyst in said hydrogel prior to said spraying thereof.

5. A process as claimed in claim 3, and maintaining in said drying zone a decreasing temperature gradient in the direction of flow of at least 50° C. per meter from the hot gas inlet to half way through said zone.

6. A process as claimed in claim 3 wherein a metal oxide of a metal from the group consisting of chromium, molybdenum, tungsten, vanadium, zinc, tin, manganese, nickel, cobalt and titanium is incorporated in said hydrogel prior to said spraying thereof.

7. A process as claimed in claim 1 wherein said hydrogel is silica hydrogel.

8. A process as claimed in claim 7 wherein said catalyst is impregnated with phosphoric acid.

9. A process for production of adipodinitrile which comprises reacting adipic acid with ammonia in a fluidized bed of a silica hydrogel catalyst, the fluidized particles of said catalyst being hollow, hydrogel spheres having a total pore volume of 0.8 to 1.3 cc. per gram, as determined by the mercury method, and having 5–20% of said total pore volume in the form of macropores of more than $2.8 \times 10^4$ A., said particles being impregnated with 5–25% by weight of phosphoric acid.

References Cited
UNITED STATES PATENTS

| | | | |
|---|---|---|---|
| 2,144,340 | 1/1939 | Lazier | 260—465.2 |
| 3,012,060 | 12/1961 | Aries | 260—465.2 |
| 3,106,574 | 10/1963 | Callahan et al. | 260—465.2 X |
| 3,206,497 | 9/1965 | Oblad | 260—465.2 |
| 3,232,977 | 2/1966 | Konig et al. | 260—465.3 |
| 3,256,311 | 6/1966 | Becke et al. | 260—465.2 X |

CHARLES B. PARKER, *Primary Examiner.*

JOSEPH P. BRUST, *Examiner.*